(12) United States Patent
Suzuki et al.

(10) Patent No.: US 7,138,769 B2
(45) Date of Patent: Nov. 21, 2006

(54) DEVICE FOR OPERATION OF A HIGH PRESSURE DISCHARGE LAMP AND A PROJECTOR DEVICE

(75) Inventors: Yoshikazu Suzuki, Yokohama (JP); Katumi Sugaja, Takasago (JP); Tomoyoshi Arimoto, Tatuno (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/012,176

(22) Filed: Dec. 16, 2004

(65) Prior Publication Data

US 2005/0140311 A1    Jun. 30, 2005

(30) Foreign Application Priority Data

Dec. 25, 2003    (JP)    ............................. 2003-428995

(51) Int. Cl.
*H05B 37/00*    (2006.01)

(52) U.S. Cl. .................. 315/289; 315/290; 315/246; 315/225; 315/291; 315/209 R; 315/DIG. 5; 353/98; 353/107

(58) Field of Classification Search ............ 315/57–63, 315/246, 289, 290, 224, 219, 225, 282, 291, 315/261, 263, 209 R, 307, DIG. 5, DIG. 7; 353/98, 107

See application file for complete search history.

(56) References Cited

U.S. PATENT DOCUMENTS

| | | | |
|---|---|---|---|
| 4,734,624 A | 3/1988 | Nagase et al. | |
| 6,575,580 B1 * | 6/2003 | Okamori et al. | 353/98 |
| 6,661,184 B1 * | 12/2003 | Okamoto et al. | 315/289 |
| 6,713,972 B1 * | 3/2004 | Nakagawa et al. | 315/291 |
| 6,927,539 B1 * | 8/2005 | Arimoto et al. | 315/59 |
| 6,943,503 B1 * | 9/2005 | Ozasa et al. | 315/224 |
| 2002/0101201 A1 | 8/2002 | Furukawa | |
| 2003/0011320 A1 | 1/2003 | Okamoto et al. | |
| 2003/0090633 A1 | 5/2003 | Miyata | |
| 2005/0206326 A1 * | 9/2005 | Suzuki et al. | 315/246 |

FOREIGN PATENT DOCUMENTS

EP    1 162 865 A2    12/2001

* cited by examiner

Primary Examiner—Haissa Philogene
(74) Attorney, Agent, or Firm—David S. Safran

(57) ABSTRACT

A device for operating a discharge lamp of the alternating current operating type has a high pressure discharge lamp with a silica glass discharge vessel in which a pair of opposed electrodes are located and on which a trigger electrode is located, a feed device which supplies an alternating discharge current to the high pressure discharge lamp, the feed device having a starter circuit, an inverter circuit with at least two switching devices; a coil which is located downstream of the inverter circuit and is series-connected to the discharge lamp; and a control element which produces on/off driving in alternation with a dead time, and in which the inductance of the coil is at most 210 μH.

6 Claims, 11 Drawing Sheets

Fig. 4(a)
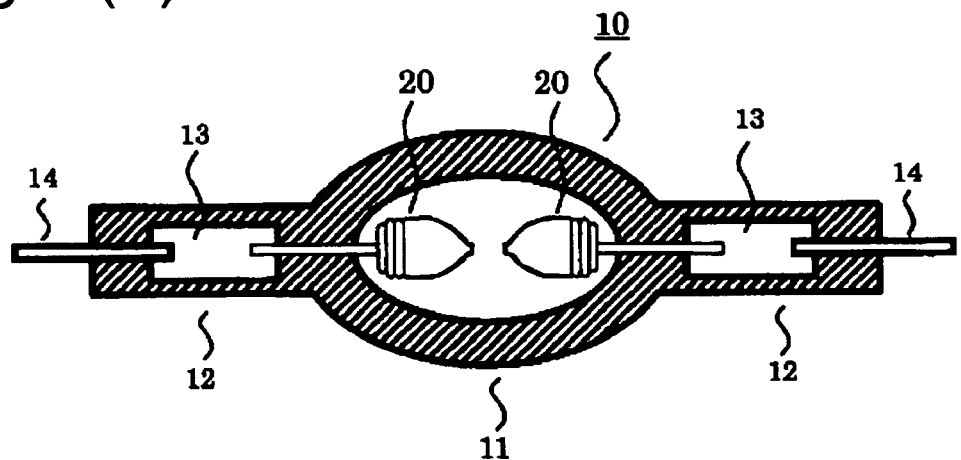
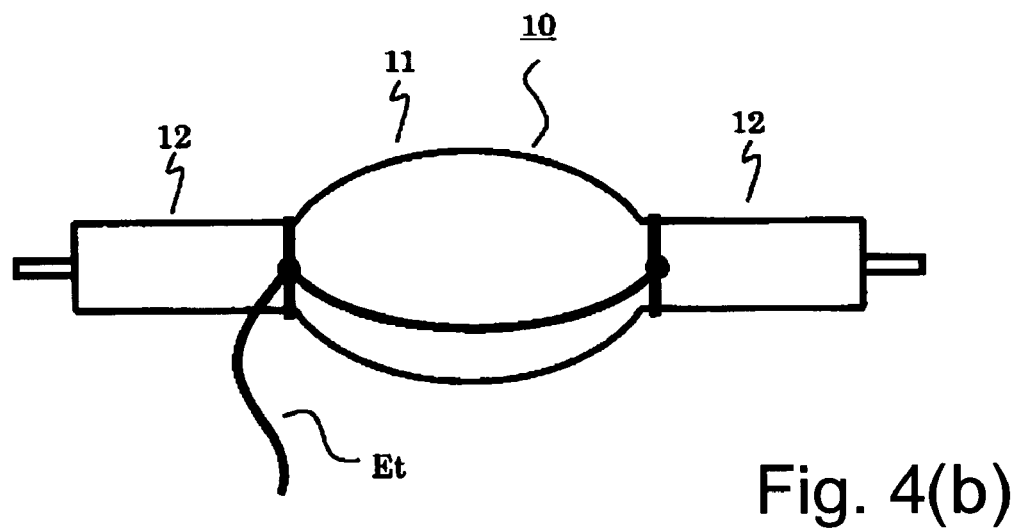
Fig. 4(b)

Fig. 11

| Inductance (μH) | Width of drop of power waveform (μs) | Flickering of picture | Evaluation |
|---|---|---|---|
| 0 | 1.8 | none | ☼ |
| 10.1 | 2.3 | none | ☼ |
| 20.5 | 2.2 | none | ☼ |
| 56.2 | 4.2 | none | ☼ |
| 66.3 | 5.5 | none | ☼ |
| 76.1 | 5.9 | none | ☼ |
| 85.6 | 6.1 | slightly | ▲ |
| 97.5 | 7.0 | slightly | ▲ |
| 109.0 | 7.1 | slightly | ▲ |
| 165.2 | 11.1 | slightly | ▲ |
| 175.3 | 11.8 | slightly | ▲ |
| 206.0 | 11.8 | slightly | ▲ |
| 216.1 | 13.2 | clearly present | X |
| 262.2 | 14.8 | clearly present | X |

DEVICE FOR OPERATION OF A HIGH PRESSURE DISCHARGE LAMP AND A PROJECTOR DEVICE

BACKGROUND OF THE INVENTION

1. Field of the Invention

The invention relates to a device for operation of a high pressure discharge lamp and a projector device.

2. Description of the Prior Art

The types of projector devices generally include one that uses a liquid crystal cell and the DLP (digital light processing) type.

In the type using a liquid crystal cell, there are the single sheet type and the three-sheet type. In each type, the following takes place:

the radiant light from the light source is separated into three colors (RGB);

the light which corresponds to the video information is transmitted and regulated by a liquid crystal cell;

afterwards, the three colors which have been transmitted by the cell are combined and projected onto the screen.

On the other hand, in the type using DLP the following takes place:

the radiant light is emitted from the light source via a rotary filter in which RGB regions are formed by division onto a space modulation element (also called a light modulation device—specifically defined as a DMD (digital micro mirror device) element or the like) or the like, by time division; and certain light is reflected by the DMD element and is emitted onto a screen.

Here, the expression "DMD element" is defined as follows:

Each pixel is covered with a few hundred million small mirrors at a time. Light projection is controlled by controlling the direction of the individual small mirrors.

The DLP type, as compared to the liquid crystal type, has the advantage that the overall device can be small and simple because the optical system is simple and because it is not necessary to use as many as three liquid crystal cells. High pressure discharge lamps, especially super-high pressure mercury lamps, are often used for the light sources of these projector devices.

FIG. 5 shows a general circuit diagram of an alternating current discharge lamp. The circuit has a direct current source $V_{DC}$, a voltage reduction chopper circuit 1 which has a switching device Qx, a full bridge circuit 2 which has switching devices Q1 to Q4, and a starter circuit 3 for starting operation.

The circuit operates as follows:

By supplying voltage and current from the direct current source to the full bridge circuit 2, the switching devices Q1, Q4 and the switching devices Q2, Q3 of the full bridge circuit 2 are turned on in alternation, and an alternating current voltage with rectangular waves is supplied to the discharge lamp 10.

The high pressure discharge lamp is operated in this way.

When the discharge lamp 10 is started, a high voltage pulse is applied by the above described starter circuit 3 to the discharge lamp 10, and thus the lamp is started.

In the full bridge circuit 2, there is a time which is the so-called dead time and in which all switching devices Q1 to Q4 are turned off. The reason for this is to prevent a cross current and damage to the switching devices Q1 to Q4.

Even when the dead time has expired and some switching device is being turned on, the desired amount of lamp current does not flow immediately, but, as shown using a gentle rising waveform, it gradually increases and reaches the desired amount. The reason for this is that, between the output of the full bridge circuit 2 and the discharge lamp, there are a coil L1, a capacitor C1 and a transformer Tr1.

This gentle rising of the lamp current becomes a major factor for reducing the light intensity of the discharge lamp because the lamp current is not 0, but an insufficient feed amount.

This origin of the dead time and the gentle rise of the lamp current after expiration of the dead time do not cause any special disadvantage for a general application. The reason for this is that the light dip due to the dead time and to the gentle rise of the following current is roughly 100 μsec and that no influence is exercised in practice as the fluctuation of the light intensity.

However, in a projector device of the gradual chromatic type using a space modulation element and a rotary color filter and the like, there is a fatal disadvantage associated with the indicated effect. The reason for this is that, in the case of using a space modulation element and a rotary filter, even when the light intensity fluctuates with an amount of several 10 μsec, a major influence can be exerted on the precision of the projected image (compare JP-A SHO 62-26796).

SUMMARY OF THE INVENTION

A primary object of the present invention is, in a device for operating a discharge lamp of the alternating current operating type which is used for a projector device of the DLP type, to devise an arrangement in which the decrease of lamp wattage and of the amount of light as a result of switching the polarity can be advantageously eliminated.

The above described object is achieved, according to a first aspect of the invention, in a device for operating a high pressure discharge lamp which comprises:

a high pressure discharge lamp in which there is a pair of opposed electrodes in a silica glass discharge vessel and a trigger electrode is located outside of the discharge vessel; and a feed device which supplies an alternating discharge current to the high pressure discharge lamp, by the feed device comprising:

a starter circuit which produces a high voltage with respect to the trigger electrode when operation is started;

an inverter circuit which has at least two switching devices;

a coil which is located downstream of this inverter circuit and which is series-connected to the discharge lamp; and a control element which subjects the above described switching devices to on or off driving in alternation, there being a dead time, and that the inductance of the above described coil is at most 210 μH.

The object is achieved according to another aspect of the invention in a projector device which comprises the following:

a rotary filter in which the color regions of at least R(ed)G(reen)B(lue) are formed;

a rotary drive means for this rotary filter;

a space modulation element which receives the light which has passed through this rotary filter; and a device for operating a high pressure discharge lamp, by the above described operation device having a high pressure discharge lamp in which a pair of opposed electrodes are located in a silica glass discharge vessel and a trigger electrode is located outside of the discharge vessel, and a feed device which supplies an alternating discharge current to the high pressure discharge lamp, and by the feed device comprising the following:

a starter circuit which produces a high voltage with respect to the trigger electrode when operation is started;

an inverter circuit which has at least two switching devices;

a coil which is located downstream of this inverter circuit, which is series-connected to the discharge lamp and which has a value of at most 210 µH; and a control element which subjects the switching devices to on or off driving in alternation with a dead time, and that the above described control element subjects the switching devices to ON/OFF driving asynchronously to the rotary filter and the space modulation element.

The object is achieved according to another aspect of the invention in a device for operating a high pressure discharge lamp which comprises:

a high pressure discharge lamp in which in a silica glass discharge vessel there is a pair of electrodes opposite; and a feed device which supplies an alternating discharge current to this high pressure discharge lamp, by the feed device comprising the following:

a starter circuit which applies a direct current high voltage to the above described pair of electrodes when operation is started;

an inverter circuit which has at least two switching devices;

a coil which is located downstream of this inverter circuit and which is series-connected to the discharge lamp;

a control element which subjects the above described switching devices to on or off driving in alternation with a dead time, and and by the starter circuit comprising the following:

a capacitor which is connected parallel to the discharge lamp;

a charging circuit for this capacitor;

a diode for preventing a reverse current with respect to the direct current high voltage of this capacitor which is series-connected to the discharge lamp; and a circuit which short circuits this diode to prevent a reverse current during rated operation, and that the inductance of the above described coil is less than or equal to 210 µH.

The object is attained according to another aspect of the invention in a projector device which comprises the following:

a rotary filter in which color regions of at least RGB are formed;

a rotary drive means for the rotary filter;

a space modulation element which receives the light which has passed through the rotary filter; and a device for operating a high pressure discharge lamp, by the above described operation device having a high pressure discharge lamp in which a pair of opposed electrodes are located in a silica glass discharge vessel, and a feed device which supplies an alternating discharge current to this high pressure discharge lamp, the feed device comprising:

a starter circuit which applies a direct current high voltage to the above described pair of electrodes when operation is started;

an inverter circuit which has at least two switching devices;

a coil which is located downstream of this inverter circuit, which is series-connected to the discharge lamp, and which has less than or equal to 210 µH; and a control element which subjects the above described switching devices to on or off driving in alternation with a dead time, and the above described starter circuit comprising:

a capacitor which is connected parallel to the discharge lamp;

a charging circuit for the capacitor;

a diode for preventing a reverse current with respect to the direct current high voltage of the capacitor which is series-connected to the discharge lamp; and a circuit which short circuits the diode to prevent a reverse current during rated operation, and in which the above described control element subjects the switching devices to ON/OFF driving asynchronously to the rotary filter and the space modulation element.

An object according to another aspect of the invention for a device for operation of the high pressure discharge lamp is achieved in that the above described feed device subjects the discharge lamp to operating control with a frequency which is selected as the rated operating frequency from the range from 60 Hz to 1000 Hz, and moreover, it operates the discharge lamp intermittently only over a short time interval with a frequency which is lower than this rated operating frequency and which is in the range of 5 Hz to 100 Hz.

Advantages

The inventors have established the following effects:

1. By the measure that, in a discharge lamp of the so-called outside trigger type in which there is a trigger electrode located outside of the discharge lamp, the inductance of the coil which is series-connected to this discharge lamp is fixed at a value that is at most 210 µH, the dip of the light intensity as a result of polarity switching of the discharge lamp can be reduced to a degree which is not regarded as disadvantageous in practice. For this reason, it is no longer necessary to attempt synchronization to the space modulation element, such as a DMD or the like, and to the rotary filter. A special circuit for synchronous control is not needed, and moreover, there is the major effect that polarity switching in operation using the alternating current of the discharge lamp can be confirmed independently of the space modulation element and of the rotary filter.

2. In a discharge lamp of the so-called DC starter type in which a direct current high voltage is applied to the discharge lamp when operation starts, there is also the same effect.

The invention is further described below with reference to the accompanying drawings.

BRIEF DESCRIPTION OF THE DRAWINGS

FIGS. 4(a) & 4(b) are, respectively, a sectional view and an elevational view of a discharge lamp;

FIG. 11 is a table of the results of tests which show the action of the invention.

DETAILED DESCRIPTION OF THE INVENTION

Figure 1:
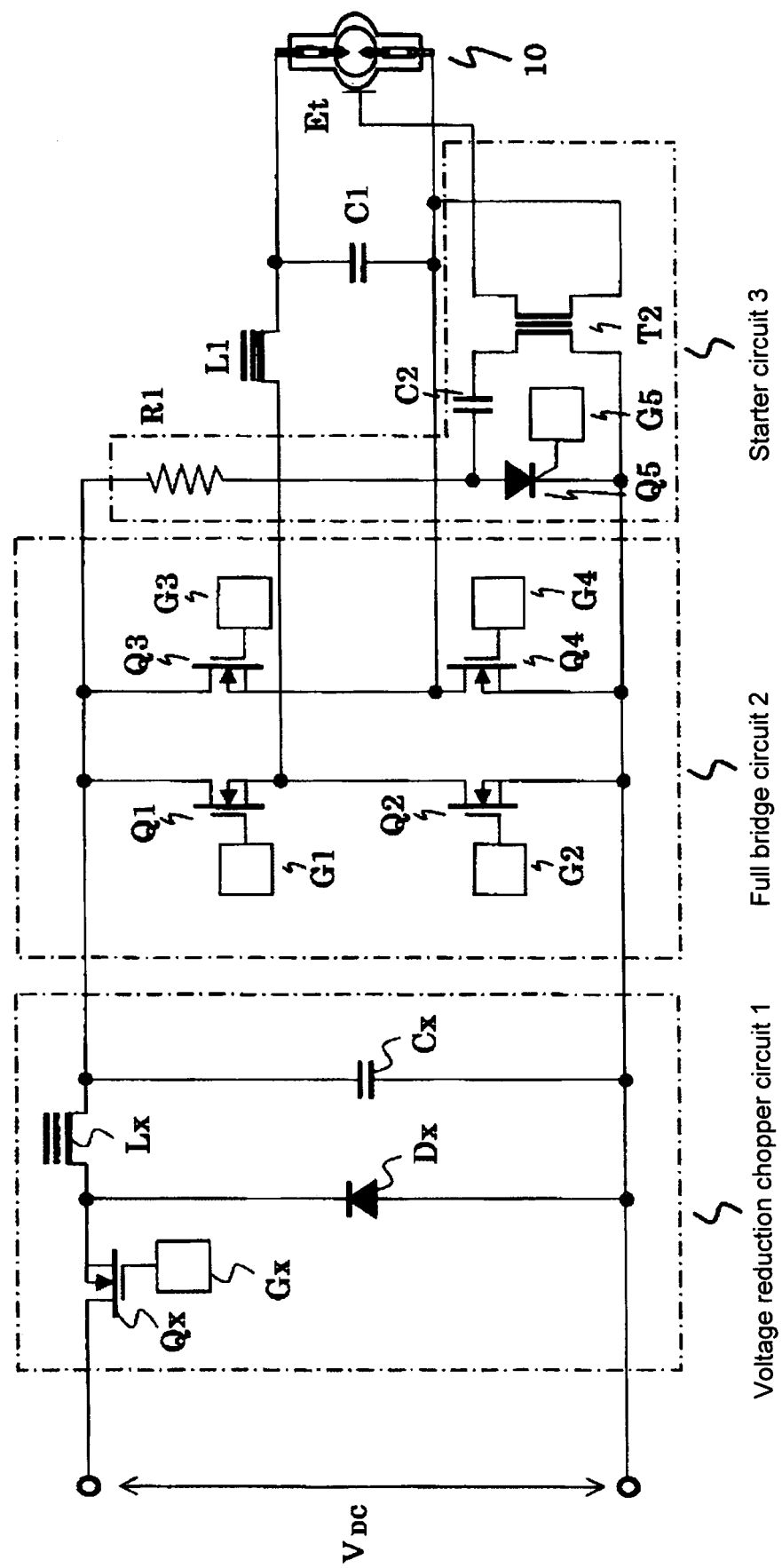
FIG. 1 is a schematic of a device in accordance with the invention for operating a high pressure discharge lamp.

FIG. 1 schematically shows the arrangement of a device for operating a high pressure discharge lamp according to a first aspect of the invention.

The operating device comprises a discharge lamp 10 and a feed device. The feed device comprises a voltage reduction chopper circuit 1 to which a direct current voltage is supplied, an inverter circuit of the full bridge type 2 (hereinafter also called a full bridge circuit) which is connected to the output side of the voltage reduction chopper circuit 1 and which changes the direct current voltage into an alternating current voltage with rectangular waves and supplies it to the high pressure discharge lamp 10 (hereinafter also called a discharge lamp), a coil L1 which is connected in series to the discharge lamp, a capacitor C1 and a starter circuit 3. The feed device together with the discharge lamp 10 forms the operating device and itself is formed of the voltage reduction chopper circuit 1, the full bridge circuit 2 and the starter circuit 3.

The voltage reduction chopper circuit 1 is connected to a direct current source VDC and comprises a switching device Qx, a diode Dx, a coil Lx, a smoothing capacitor Cx and a driver circuit Gx of the switching device Qx. The switching device Qx is subjected to on/off driving by the driver circuit Gx. By this driving, the pulse duty factor is regulated. Thus, the current or the wattage which is supplied to the discharge lamp 10 is controlled.

The full bridge circuit 2 comprises switching devices Q1 to Q4, such as a transistor or a FET which are connected in the manner of a bridge, and driver circuits G1 to G4 of the switching devices Q1 to Q4. There are also cases in which diodes are connected anti-parallel to the parallel switching devices Q1 to Q4. However, the diodes are omitted in this embodiment.

The above described switching devices Q1 to Q4 are driven by the driver circuits G1 to G4 via a control element, supply an alternating current with rectangular waves to the discharge lamp 10, and operate the discharge lamp 10.

Operation takes place as follows:

The switching devices Q1, Q4 and the switching devices Q2, Q3 are turned on in alternation. An alternating current with rectangular waves is supplied to the discharge lamp 10 in the following path: voltage reduction chopper circuit 1→switching device Q1→discharge lamp 10→coil L1→switching device Q4→voltage reduction chopper circuit 1 and in the following path: voltage reduction chopper circuit 1→switching device Q2→coil L1→discharge lamp 10→switching device Q3→voltage reduction chopper circuit 1.

When driving the above described switching devices Q1 to Q4, to prevent simultaneous switching-on of the switching devices Q1 to Q4, there is a time period (dead time Td) when the polarity of the rectangular alternating waves is switched, in which all switching devices Q1 to Q4 are turned off, as was described above.

The frequency of the output of the rectangular alternating waves which are supplied to the discharge lamp 10 is in the range from 60 Hz to 1000 Hz, for example, 200 Hz. The duration of the above described dead time is normally within the range from 0.5 µs to 10 µs. In the case of a frequency of the output of the rectangular alternating waves of 200 Hz, the dead time Td is selected to be, for example, roughly 1 µs.

Figure 2A:
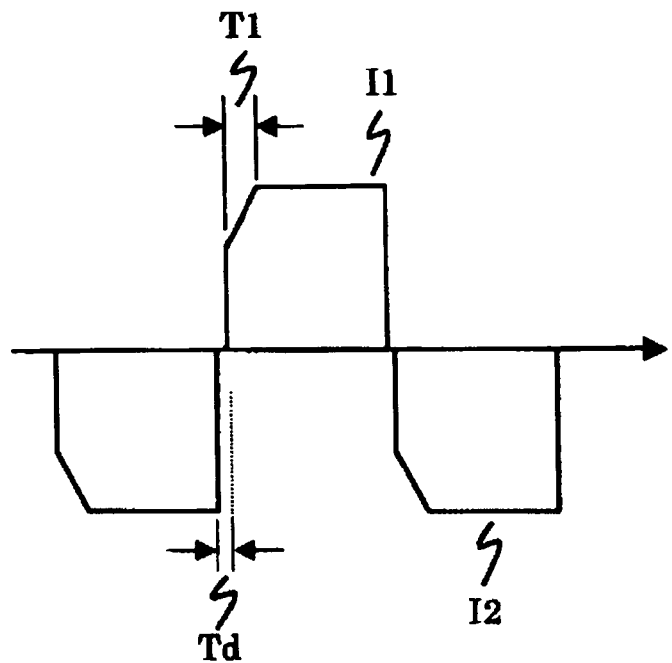
FIGS. 2(a) to 2(c) each show a plot of the current waveform of a device in accordance with the invention for operating a high pressure discharge lamp.
Figure 2B:
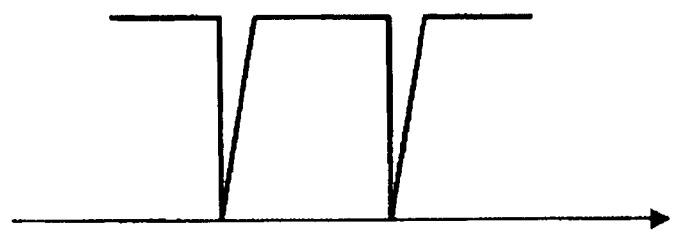
Figure 2C:
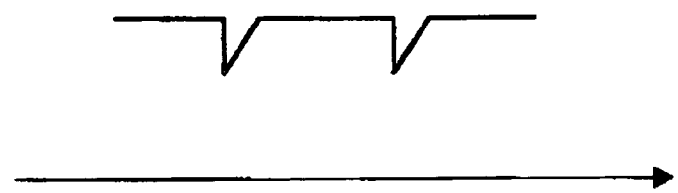

FIGS. 2(a) to 2(c) each show the effect of the discharge lamp 10 during the dead time. FIG. 2(a) schematically shows the waveform of the current which is flowing in the discharge lamp 10. FIG. 2(b) schematically shows the wattage waveform of the discharge lamp 10. FIG. 2(c) schematically shows the intensity of the light which is emitted from the discharge lamp 10.

In FIGS. 2(a) to 2(c) the x-axis plots the time. In FIG. 2(a), the y-axis plots the amount of current. In FIG. 2(b), the y-axis plots the amount of wattage. In FIG. 2(c), the y-axis plots the value of the light intensity. In FIG. 2(a), the waveform of the current which flows when the switching devices Q1, Q4 are turned on is designated the current waveform I1. In FIG. 2(a), the waveform of the current which flows when the switching devices Q2, Q3 are turned on is designated the current waveform I2. The so-called dead time is labeled Td and is shown between the two waveforms and during which the amount of current is 0. If, at this point, the current waveform I1 is examined, after the dead time Td, there is a starting time T1. According to the invention, it was found that this starting time T1 reduces the light intensity of the discharge lamp and influences the accuracy of the projected image.

The starter circuit 3 has a resistor R1, a switching device Q5, a capacitor C2, a high voltage transformer T2 and a driver circuit G5 for the switching device Q5. Since the input point on the high voltage side and the input point on the low voltage side of the starter circuit 3 are connected parallel to the discharge lamp 10, the same voltage as the voltage which is applied to the discharge lamp 10 is also supplied to the starter circuit 3. When this applied voltage is received, the capacitor C2 is charged via the resistor R1 in the starter circuit 3.

The switching device Q5 has a SCR thyristor and the like. When the switching device Q5 is closed by the driver circuit G5, on the primary winding of the high voltage transformer T2, a charging voltage of the capacitor C2 is formed, and on the secondary winding, a trigger voltage for an insulation breakdown is formed.

One end of the secondary winding of the high voltage transformer T2 is located on the outside surface of the discharge lamp 10 as a trigger electrode Et. On the other hand, the other end of the secondary winding is electrically connected to one of the electrodes of the discharge lamp 10.

If a trigger voltage is produced by this circuit when operation of the discharge lamp 10 is started, between the trigger electrode Et and the electrodes in the discharge vessel, a so-called dielectric barrier discharge is formed which takes place through the silica glass (material of the discharge vessel). When a plasma is formed in the discharge vessel by this dielectric barrier discharge, between the first electrode and the second electrode in the discharge vessel, a discharge is formed by a no-load voltage which has been applied beforehand, this plasma acting as a trigger.

The trigger voltage is 5 kV to 20 kV, for example, 13 kV. The no-load voltage is 250 V to 400 V, for example 350 V.

Here, the trigger electrode Et is located on the outside of the discharge vessel. The transformer, for producing a high voltage, is therefore not series-connected to the discharge lamp, as in the circuit shown in FIG. 5. This means that a major feature lies in that a type is not used in which the high voltage is produced between the electrodes of the discharge lamp when operation starts (hereinafter also called the "outside trigger type").

This circuit is extremely advantageous with respect to the fact that the inductance for producing a high voltage (secondary winding of the transformer for producing a high voltage) which is required only when operation starts, is not present in the path of current feed after starting of operation.

Figure 5:
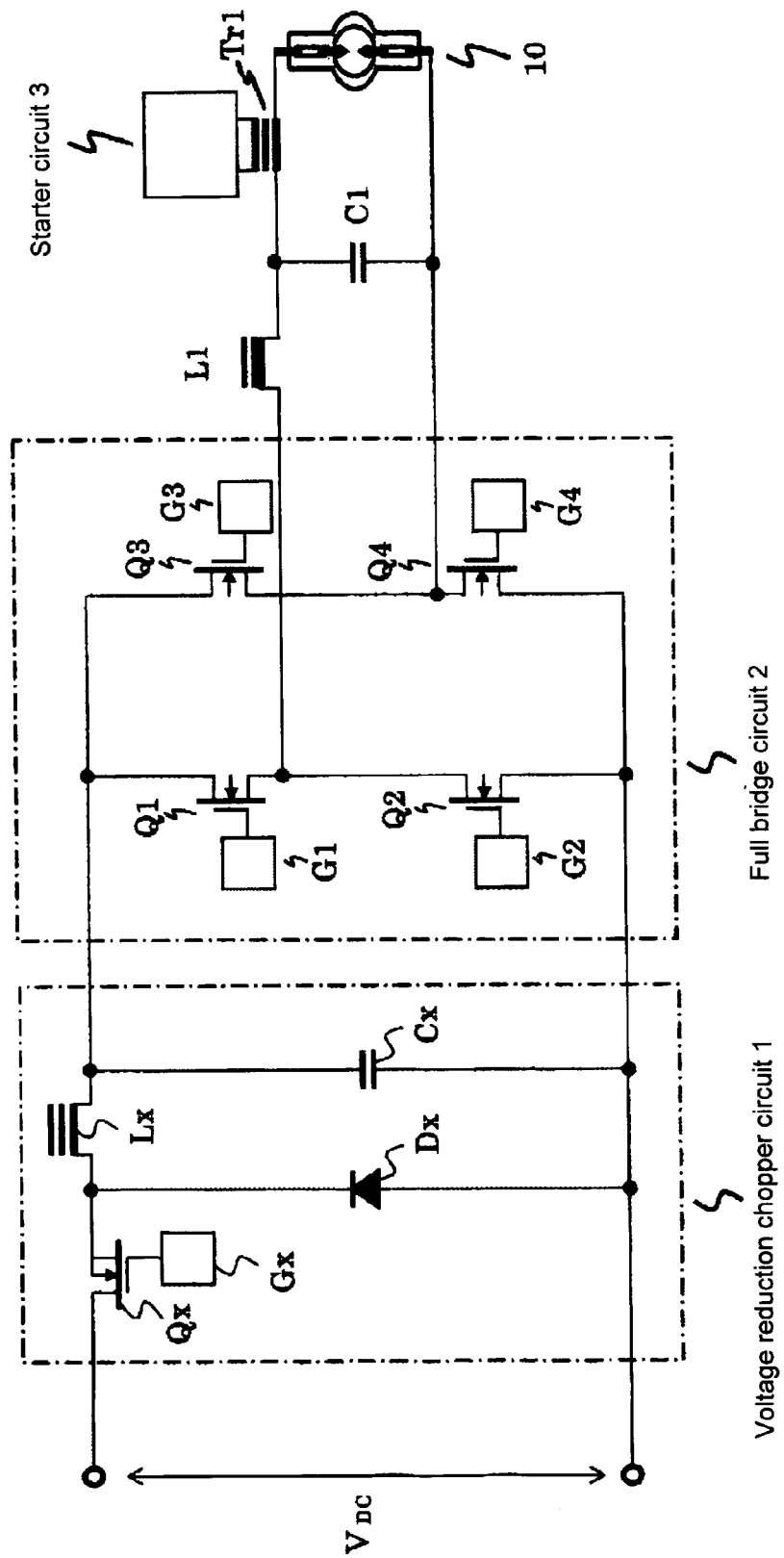
FIG. 5 shows the general circuit of a discharge lamp of the alternating current operation type.

Specifically, in the circuit shown in FIG. 5, after the discharge lamp is started up, the lamp current flows in the secondary winding with high inductance.

It was found that, in accordance with the invention, this secondary winding causes a prolongation of the above described current starting time T1. By omitting this inductance component, according to the invention, the prevention of a reduction of the light intensity of the discharge lamp and prevention of the reduction of the accuracy of the projected image are achieved.

In the circuit shown in FIG. 5, using a changeover switch or the like, a circuit is theoretically possible in which, after starting of operation, the secondary winding in the line path of current feed is not used. Here however the number of parts increases. The circuit becomes complicated and large. It is therefore not desirable. This is because, especially in a projector device, due to the considerable reduction in the size of the device, there is a great demand for simplification of the circuit.

Furthermore, the invention is characterized in that, in addition to the above described new finding of the outside trigger type, the inductance component in the path of current feed from the output of the full bridge circuit 2 to the discharge lamp 10 is fixed at less than or equal to 210 µH.

Here, the inductance, strictly speaking, is not only the coil L1, but it is the sum of the inductances in the current loop which is formed in rated operation of the discharge lamp 10. However, the inductance is significantly determined by the inductance of the coil L1. Therefore, in accordance with the invention, the numerical values are fixed with consideration of the inductance of the coil L1. As a result, fixing of the numerical values of the inductance takes place more preferably by the sum of the inductances in the current loop during rated operation, that is, in the capacitor Cx, the full bridge circuit 2, the coil L1, the discharge lamp 10, the full bridge circuit 2 and the capacitor Cx. From the standpoint of the practical effect, however the coil L1 is subject to fixing of the numerical value.

Furthermore, the inventors have found that, in a power dip (instantaneous drop of power), by polarity switching of the discharge lamp for a time that is at most 12 µsec, a drop of the light intensity as the light source of a projector device of the DLP type is not regarded as disadvantageous in practice. The inventors have also found that the effect of the reduction of light intensity is completely prevented and that an operating state can be produced which is equivalent to operation using a direct current, as if the discharge lamp were not subjected to a polarity change, if more preferably the duration of the power dip is at most 6 µsec.

As was described above, in the circuit type shown in FIG. 5, in the prior art, i.e., in a circuit type in which the secondary winding of the transformer for producing a high voltage for starting operation is series-connected to the discharge lamp, depending on the arrangement of the starter circuit, it is difficult to fix the inductance to be less than or equal to 210 µH. According to the invention, together with the use of the outside trigger circuit type, this type of circuit was used, and therefore, precisely the conception of reduction of the inductance was achieved.

The coil L and the capacitor C1 are necessary in rated operation of the lamp to prevent noise. It is desirable that specifically an inductance of at least 0.15 µH be present.

Figure 3:
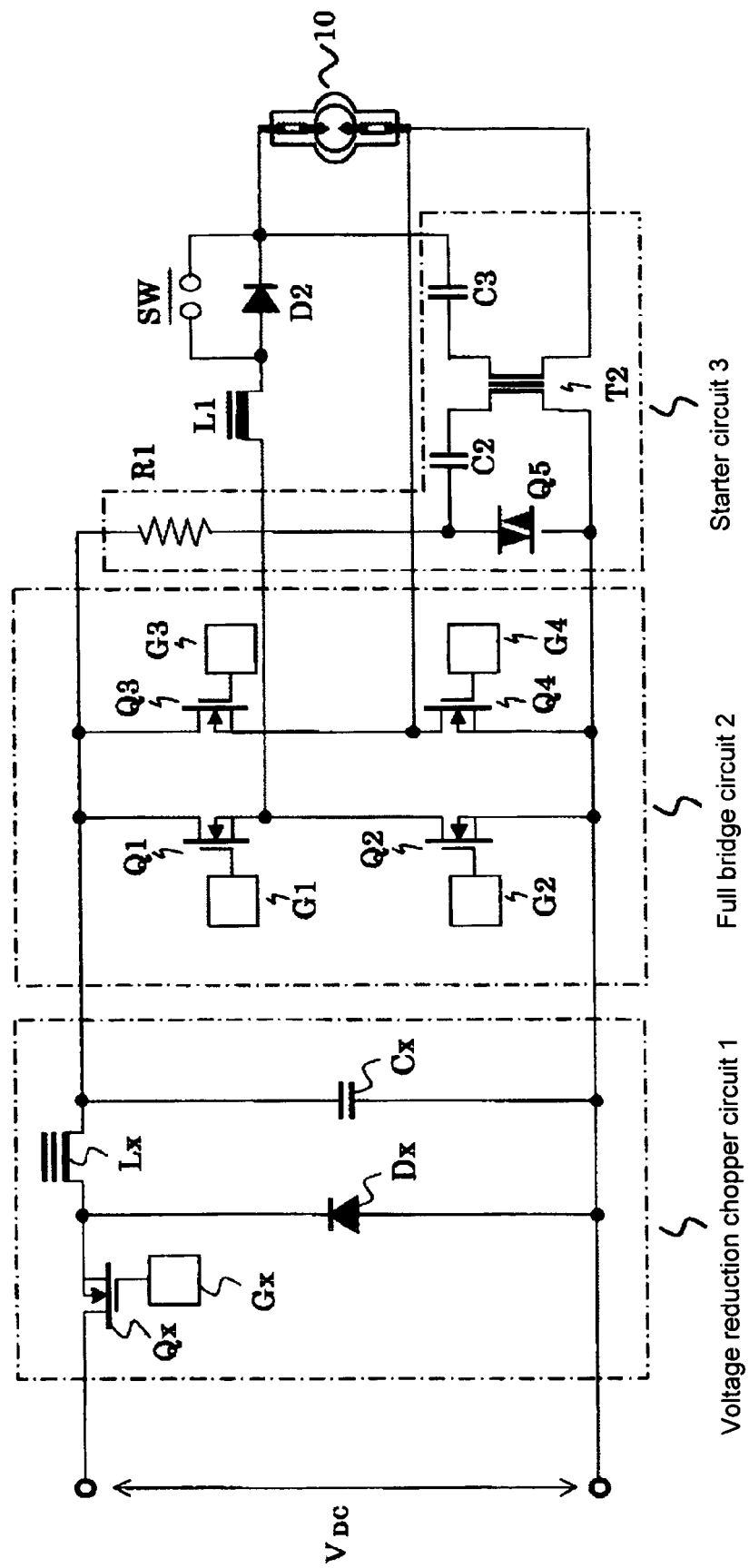
FIG. 3 is a schematic of a device of the invention for operating a high pressure discharge lamp.

FIG. 3 schematically shows the arrangement of a device according to a second aspect of the invention for operating a high pressure discharge lamp. The voltage reduction chopper circuit 1 and the full bridge circuit 2 have the same arrangements and the same operation as the circuit shown in FIG. 1. Only the starter circuit 3 differs. Thus, a description of the voltage reduction chopper circuit 1 and the full bridge circuit 2 will not be repeated.

The starter circuit 3 has a resistor R1, a switching device Q5, a capacitor C2, a capacitor C3 and a transformer T2. Since the input point on the high voltage side and the input point on the low voltage side of the starter circuit 3 are connected in parallel to the full bridge circuit 2, the same voltage as the voltage applied to the full bridge circuit 2 is also supplied to the starter circuit 3. When this voltage is received, the capacitor C2 is charged via the resistor R1 in the starter circuit 3.

The switching device Q5 has a component, such as a thyristor or the like. When the voltage of the capacitor C2 reaches a given value, a switching device Q6 closes and the capacitor C3 is charged via the transformer T2. When a given high voltage is charged in the capacitor C3, the capacitor C3 is discharged. In this way, current is supplied to the discharge lamp 10. This discharge current is a direct current. In this way, the discharge of the discharge lamp 10 begins. A diode D2 prevents backflow of the discharge current of the capacitor C2 to the full bridge circuit 2. After starting of discharge of the discharge lamp 10, a short circuit of the diode D2 takes place by closing of a switch SW.

Afterwards, a given current is supplied via the switch SW of the discharge lamp 10 from the full bridge circuit 2.

Therefore, the capacitor C3 is a capacitor which applies a direct current high voltage to the discharge lamp 10. The diode D2 is a diode for preventing a reverse current with respect to the direct current high voltage of the capacitor C3. This switch SW is a circuit which brings a short circuit of the diode to prevent a reverse current D2. The arrangement of the capacitor C3 is not limited to the arrangement in which it is connected in parallel to the discharge lamp 10, but it can also be connected in parallel, for example, to the diode for preventing the reverse current D2.

Since, in this circuit, the starter circuit 3 drops out of the path of current feed to the discharge lamp 10 after operation starts, inductance components for producing a high voltage which are required only when operation is being started, for example, the transformer T2 and the like, are not present in the current feed path after starting of operation.

Furthermore, the coil L1 can be set to be small only from the standpoint of preventing noise. As a result, as in the circuit shown in FIG. 1, the reduction of the light intensity of the discharge lamp and the reduction of the accuracy of the projected image can be prevented.

FIGS. 4(a) & 4(b) show the entire arrangement of the discharge lamp. FIG. 4(a) shows the internal arrangement and FIG. 4(b) shows the external arrangement including the trigger electrode. FIG. 4(a) does not show the trigger electrode. In the discharge lamp shown in FIG. 3, the trigger electrode Et is not present.

In the figure, a discharge lamp 10 has an essentially spherical light emitting part 11 which has a discharge vessel of silica glass. In this light emitting part 11, there is a pair of opposed electrodes 20. From each end of the light emitting part 11, extends a respective hermetically sealed portion 12 into which a normally molybdenum conductive metal foil 13 is hermetically installed, for example, by a shrink seal. For the pair of electrodes 20, electrode rods are welded and electrically connected to the metal foils 13. An outer lead 14, which projects to the outside, is welded to the other end of the respective metal foil 13.

The trigger electrode Et is located on the outside of the light emitting part 11. The trigger electrode Et comes from the starter circuit 3 in FIG. 1. After winding around the base point of one of the hermetically sealed portions 12 it is arranged such that it comes into contact with the surface of the light emitting part 11 and bridges it. It then winds around the base point of the other hermetically sealed portion 12.

The light emitting part 11 is filled with mercury, rare gas and halogen gas. The mercury is used to obtain the required wavelength of visible radiation, for example, to obtain radiant light with wavelengths from 400 nm to 700 nm and is in an amount that is at least equal to 0.15 mg/mm$^3$. With this amount added, also depending on the temperature conditions, during operation, a vapor pressure of at least 150 atm, therefore an extremely high vapor pressure, is achieved. By adding a larger amount of mercury, a discharge lamp can be produced with a high mercury vapor pressure during operation of at least 200 or 300 atm. The higher the mercury vapor pressure, the more suitable the light source for a projector device which can be implemented.

For example, roughly 13 kPa of argon gas is added as the rare gas. It is used to improve the ignitability.

As the halogen, iodine, bromine, chlorine and the like in the form of a compound with mercury or another metal is added. The amount of halogen added is selected from the range from $10^{-6}$ μmol/mm$^3$ to $10^{-2}$ μmol/mm$^3$. The function of the halogen is to prolong the service life using the halogen cycle. For an extremely small discharge lamp with an extremely high internal pressure, like the discharge lamp of the invention, the main purpose of adding this halogen is to prevent devitrification of the discharge vessel.

The following numerical values for a discharge lamp are shown below by way of example.
- the maximum outside diameter of the light emitting part is 9.4 mm;
- the distance between the electrodes is 1.0 mm;
- the inside volume of the arc tube is 85 mm$^3$;
- the rated voltage is 75 V; and
- the rated wattage is 120 W.

The lamp is operated using an alternating current.

This discharge lamp is installed in a projector device which is to be as small as possible. Since, on the one hand, the overall dimensions of the device are extremely small and since, on the other hand, there is a demand for a large amount of light, the thermal effect in the arc tube part is extremely strict. The value of the wall load of the lamp is 0.8 W/mm$^2$ to 2.0 W/mm$^2$, specifically 1.3 W/mm$^2$.

That the lamp has such a high mercury vapor pressure and such a high value of the wall load leads to the fact that it can offer radiant light with good color reproduction, when it is installed in a projector device or a presentation apparatus, such as an overhead projector or the like.

In FIGS. 1 & 3, the full bridge circuit 2 is described using a circuit which has four switching devices. However, it is not limited to this configuration, and another circuit can also be used. In particular, the number of switching devices need not be four and it is enough if at least two switching devices are ON-OFF driven in alternation with a dead time in between.

The voltage reduction chopper circuit is not an essential material component, and another type of circuit can be used as the means for regulating the amount of current.

For the capacitor Cx which is present in the voltage reduction chopper circuit, there can be an arrangement in which, when operation starts and in rated operation, the capacitance changes. It can be imagined that, in this arrangement, for example, several capacitors are connected in parallel to one another and that the circuit is switched by the switching devices.

Figure 6:
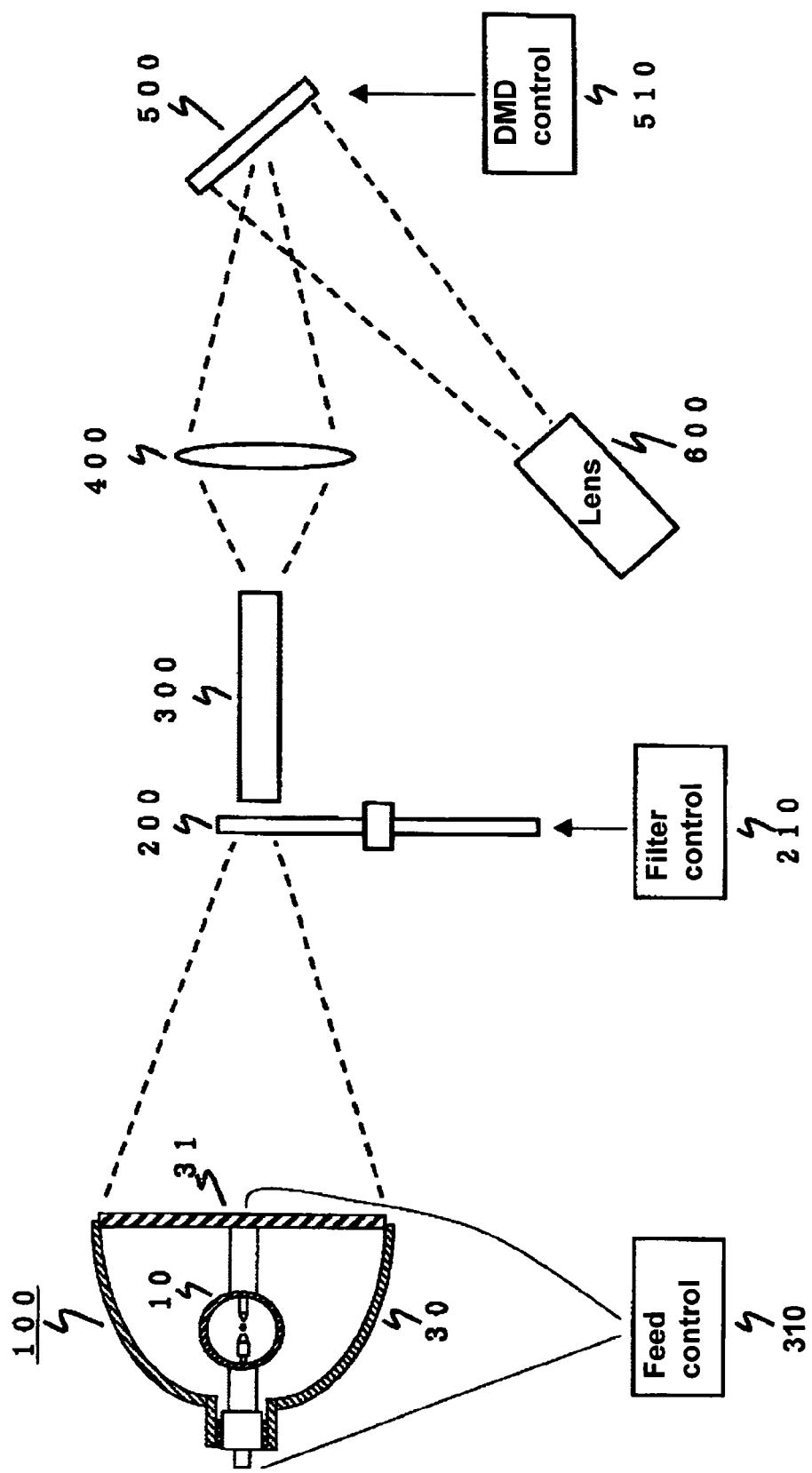
FIG. 6 shows a schematic diagram depicting the overall arrangement of a projector device.

FIG. 6 schematically shows the arrangement of a projector device which consists of a light source device 100, a rotary filter 200, a rod integrator lens 300, a lens 400, a space modulation element 500 (hereinafter also called a DMD element) and a lens 600. The light source device 100 has a discharge lamp 10 and a concave reflector 30.

In the light source device 100, the arc spot of the discharge lamp 10 and the first focal point of the concave reflector 30 agree with one another. A second focal point of the concave reflector 30 is positioned on the incidence end of the rod integrator lens 300. The light which has been reflected by the concave reflector 30 is incident via the rotary filter 200 on the rod integrator lens 300. The discharge lamp 10 is subjected to feed control by a feed control device 310. The filter 200 is subjected to rotary control by a filter control device 210. The DMD element 500 is controlled by a control device 510.

The discharge lamp 10 is operated, for example, with a rated wattage of 120 W and a rated current of 1.6 A. A transparent glass component 31 is installed in the forward opening of the concave reflector 30.

Figure 7A:
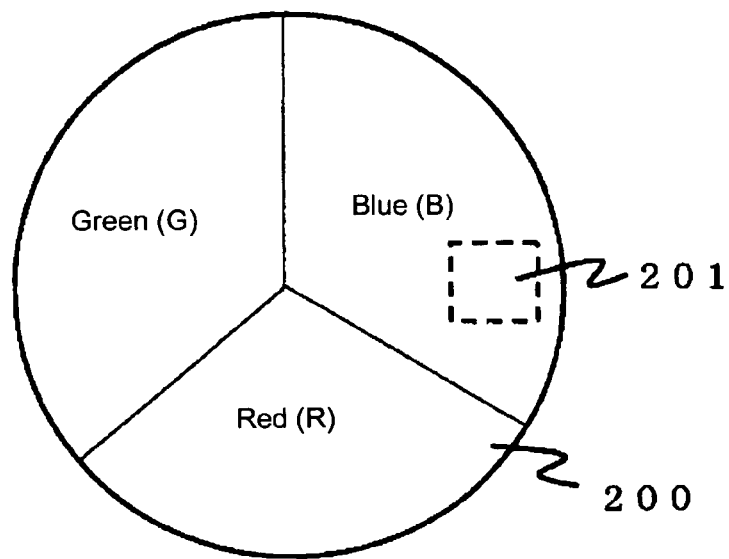
FIGS. 7(a) & 7(b) each show a rotary filter.
Figure 7B:
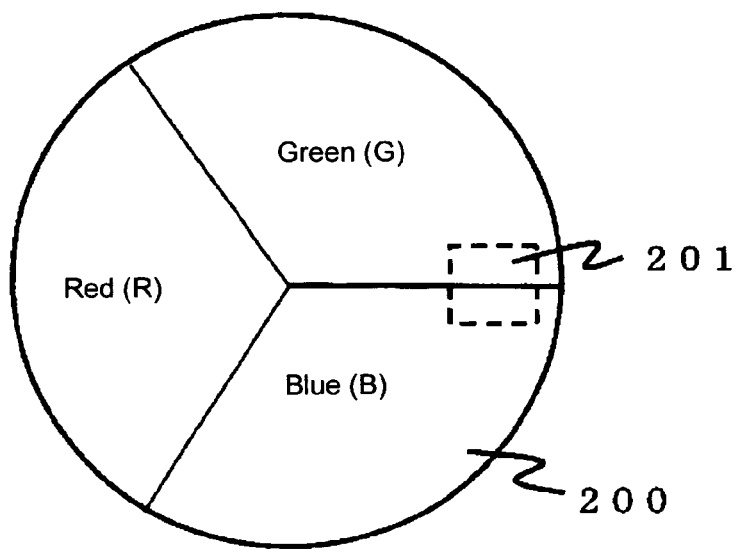

FIGS. 7(a) & 7(b) each show the rotary filter 200 enlarged. FIG. 7(a) shows a state in which the blue color is projected. FIG. 7(b) shows the state in which the boundary between the blue color and the green color is projected.

The rotary filter is also called a color filter and is formed of a disk-shaped glass. In the filter, a red (R) area, a green (G) area and a blue (B) area are each formed in a fan-shaped manner.

The light which has been reflected by the light source device 100 is transmitted by a light transmitting area 201 which is formed on the rotary filter 200. By rotating the filter 200, the colors which correspond to the light transmission area 201 are gradually routed to a rear rod lens. Therefore, since red (R), green (G) and blue (B) are projected with time division, instantaneously only one of the colors is projected. However, for human eyes, these colors or mixed colors are recognized as images. Furthermore, there are also cases in which, besides red (R), green (G) and blue (B), also white (W) is taken. White (W) is used to make the image bright overall. However, in this embodiment, white (W) is advantageously omitted.

Here, the filter 200 turns, for example, with 180 Hz (180 rpm). Red (R), green (G) and blue (B) are therefore projected 180 times per second.

As light sources of these projector devices, often high pressure discharge lamps, especially super-high pressure mercury lamps, are used, and in the case of operation using an alternating current, they are operated essentially in the frequency range from 150 Hz to 200 Hz.

In the device of the invention for operating a high pressure discharge lamp, it is not necessary to attempt synchronization of the operating frequency of the discharge lamp with the driving frequency of the space modulation element and with the frequency of the color change of the rotary filter. There is the advantage that the frequency can be controlled independently.

The above described circumstance is explained in detail below.

In a conventional operating device, the operating frequency of a discharge lamp must be synchronized with the driving frequency of the space modulation element. Depending on the timing of polarity switching of the discharge lamp, the phenomenon occurred that the video information was disrupted and the accuracy of the picture was reduced. Therefore, the operating frequency had to be synchronized with the driving frequency of the space modulation element and the effect of the timing of the polarity switching of the discharge lamp in conjunction with driving of the space modulation element had to be avoided. In the case, for example, in which the video signal is a PAL signal and in which the driving frequency of the space modulation element is 50 Hz, the discharge lamp is synchronized to 50 Hz and subjected to operating control with 150 Hz or 200 Hz. Furthermore, the video signal is a NTSC signal and the driving frequency of the DMD element is 60 Hz, the discharge lamp is synchronized to 60 Hz and subjected to operating control with 180 Hz.

Therefore, the feed device of the discharge lamp, for synchronization with the space modulation element, requires a synchronization terminal, a synchronization control circuit and a frequency selection circuit or the like which changes the frequency according to the driving frequency of the space modulation element.

The reason for synchronization with the rotary filter is that agreement of the timing of the polarity switching of the discharge lamp with the timing of the color change in conjunction with preventing flicker of the projected image is effective.

In order to synchronize with the frequency of the color change of the rotary filter, therefore, in the feed device, a circuit was likewise necessary with respect to synchronous control.

However, since for the device for operating a high pressure discharge lamp in this invention, first the outside trigger type or the DC starter type was used and second, the inductance in the current feed path between the output of the full bridge circuit and the discharge lamp was fixed at less than or equal to 210 µH, the actual power dip and light dip can be prevented. Therefore, it is unnecessary to synchronize the operating frequency of the discharge lamp with the driving frequency of the space modulation element and with the frequency of color change of the rotary filter. Thus, independent and moreover asynchronous drive control can be carried out. It can be stated that this point is a major feature of the projector device using the device of the invention for operating a high pressure discharge lamp.

In the case of an arrangement, in accordance with the invention, having a high pressure discharge lamp of the alternating current operating type in which the distance between the electrodes is at most 2 mm and in which the light emitting part is filled with at least 0.15 mg/mm$^3$ of mercury, rare gas, and halogen in the range from $1\times10^{-6}$ µmol/mm$^3$ to $1\times10^{-2}$ µmol/mm$^3$, the phenomenon occurs that, in the course of the operation of the lamp, a projection is produced on the electrode.

This phenomenon is not entirely clear, but the following can be assumed.

The tungsten which has evaporated from the area with the high temperature in the vicinity of the electrode tip during lamp operation combines with the halogen and residual oxygen which are present in the arc tube. When, for example, Br is added as the halogen, it is present as a tungsten compound such as $WBr$, $WBr_2$, $WO$, $WO_2$, $WO_2Br$, $WO_2Br_2$ or the like. These compounds decompose in the area with a high temperature in the gaseous phase in the vicinity of the electrode tip and become tungsten atoms or tungsten cations. By temperature-induced diffusion (diffusion of the tungsten atoms which is directed from the area with a high temperature in the gaseous phase (i.e., the arc center) in the direction to the area with a low temperature (i.e., the vicinity of the electrode tip)) and because tungsten atoms are ionized in the arc, cations are formed and during cathode operation they are pulled in the direction to the cathode by the electric field, the tungsten vapor density in the gaseous phase in the vicinity of the electrode tip becomes high, by which precipitation takes place on the electrode tip and by which projections are formed here.

Figure 8A:
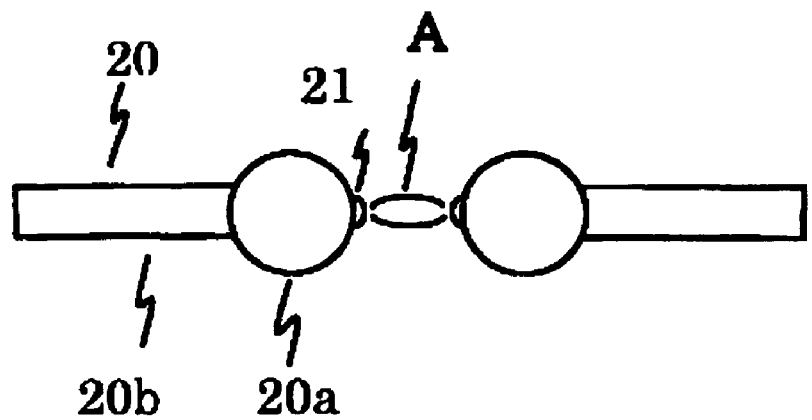
FIGS. 8(a) & 8(b) each show a schematic of arc formation between electrodes having a projection.
Figure 8B:
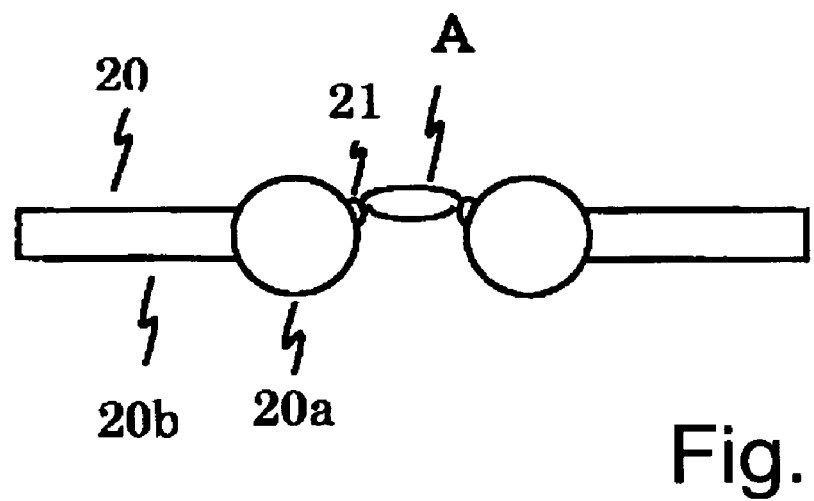

FIGS. 8(*a*) & 8(*b*) each schematically show the electrode tips and a projection thereon. The electrodes 20 each have a spherical part 20*a* and an electrode rod 20*b*. On the tip of the spherical part 20*a*, a projection 21 is formed. In the case in which, when lamp operation is started, there is no projection, the projection 21 is formed by subsequent operation, as shown in the drawings. On this projection 21, an arc discharge A forms.

Due to the formation and growth of the above described projection, there were however some disadvantages.

1. Fluctuation of the lamp voltage. The above described projection is not present in the step of completion of the lamp and not yet initiated operation and forms and grows in the course of subsequent operation. The formation of the projection does depend on the type of lamp and the like, but ends essentially after, for example, 80 minutes to 100 minutes have passed. This means that in the time after formation of this projection up to fixation to a certain degree in the course of operation the distance between the electrodes becomes shorter and also the operating voltage of the discharge lamp becomes lower.

2. Reduction of the degree of light utilization. The above described projection does not always form on the electrode axis. When, as, for example, in FIG. 8(*a*), it is formed along the electrode axis L, there is no disadvantage. There are, however, also cases in which, as shown in FIG. 8(*b*), the projection is formed diverging from the electrode axis L. In this case, the lamp arc position also diverges from the electrode axis L. The major problem arises that, in an optical system which is designed as a point light source, the degree of light utilization decreases.

Here, it is known that by the measure that the operating frequency is not made constant, but is changed in a suitable manner, the growth of the projection can be controlled. It is also known that by changing the frequency the growth and development of unwanted projections can be suppressed.

The device of the invention for operating a high pressure discharge lamp can also advantageously eliminate the disadvantage of formation of these projections. The reason for this is the following:

As was described above, it is not necessary to take into account the element of synchronization of the timing of the polarity switching of the discharge lamp with the space modulation element and the rotary filter. Therefore, the frequency can be controlled with consideration of the standpoint of control of the projection.

Figure 9A:
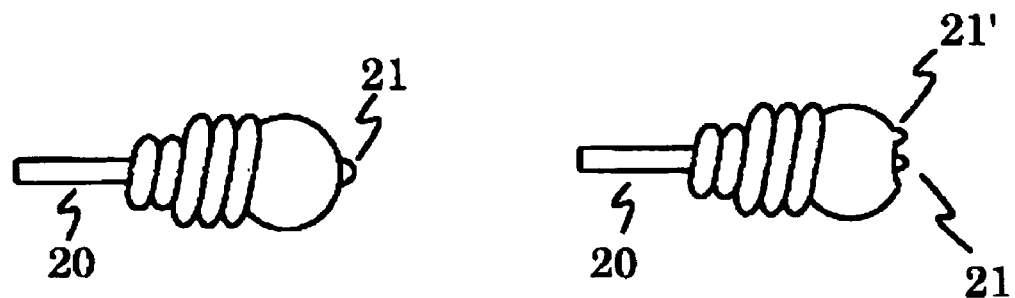
FIGS. 9(a) & 9(b) each show an electrode with a projection.
Figure 9B:
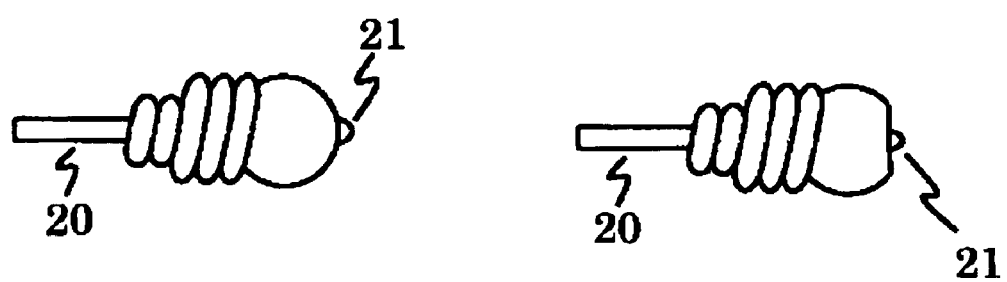
Figure 10:
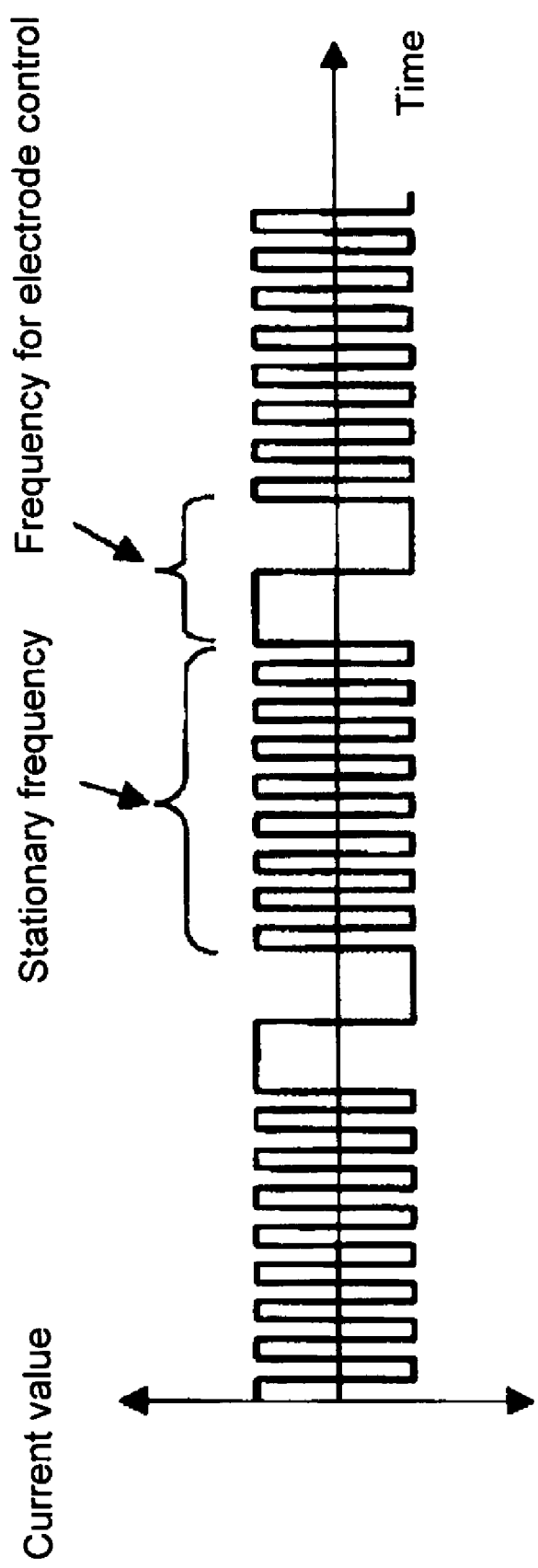
FIG. 10 is a plot of a current pulse for controlling the projection.

FIGS. 9(a) & 9(b) schematically show the relation between the growth of the projection and the frequency control of the discharge lamp. FIG. 10 is a schematic which shows the state in which, for purposes of control of the operating frequency during rated operation and of the projection, the frequency is periodically changed.

In FIGS. 9(a) & 9(b), the tip of the electrode 20 is wound with a coil. By melting this coil, a part with a larger diameter is formed on the tip. A projection 21 is formed on the tip of the part with a greater diameter. FIG. 9(a) shows the state in which, without changing the operating frequency, rated operation was always carried out with a frequency of 150 MHz. FIG. 9(b) shows a case in which, during rated operation at 150 Hz, the frequency was changed intermittently and moreover briefly. Both in FIG. 9(a) and FIG. 9(b), the left-hand representation shows the state at the beginning of starting of operation in which a projection has been formed, and the right-hand representation shows the state of the electrode after operating for a few hundred hours.

FIG. 10 shows the state of the current in which, at the rated operating frequency of 150 Hz operation, in which once per minute an interval is produced with a low frequency, for example, with a frequency of 10 Hz.

FIGS. 9(a) & 9(b) show the following:
in the case (FIG. 9(a)) in which the frequency is not controlled, the projection 21 which is present at the start was damaged. Moreover, a new projection 21' has formed at an unwanted site.
On the other hand, in the case (FIG. 9(b)) of control of the frequency for controlling the growth of the projection, unwanted growth of the projection was suppressed.

The device in accordance with the invention for operating a high pressure discharge lamp, in this way, has the major feature that, without consideration of the relation to the space modulation element and to the rotary filter, the operating frequency can be controlled and that, therefore, control of the projection can be advantageously carried out.

The phenomenon that a projection forms on the electrode tip does not in general occur in discharge lamps. In the case of the discharge lamp to which the invention relates, i.e., in the case of an arrangement in which the distance between the electrodes is at most 2 mm and in which the light emitting part is filled with at least 0.15 mg/mm$^3$ of mercury, a rare gas, and from $1\times10^{-6}$ μmol/mm$^3$ to $1\times10^{-2}$ μmol/mm$^3$ of a halogen, in the course of operation of the lamp, a projection forms on the electrode tip.

In the invention, operation is carried out in the case of a frequency during rated operation from 60 Hz to 1000 Hz with intervals at a frequency which is lower than this rated operating frequency and which is 1 Hz to 100 Hz. For example, at a frequency during rated operation of 150 Hz operation is carried out with intervals at a frequency of 7.5 Hz.

Over a short time, low frequency operation with the following timing for changing the frequency is carried out:
At an operating duration with a steady-state frequency from 30 sec to 2 minutes, 1 to 5 intervals.

Specifically, low frequency operation is carried out with a ratio of one lower frequency interval per one-minute of operation at the rated operating frequency.

According to the invention, the feed device of the outside trigger type was described using FIG. 1 and the feed device of the DC starter type was described using FIG. 3. These versions differ from one another, however, only by the arrangements for starting of lamp operation. They share a common feature in the respect that the inductance component which is necessary for starting of operation was omitted from the circuit loop during rated operation.

Therefore, the measure in accordance with the invention that the value of the inductance is fixed to be at most 210 μH cannot be used in these operating start types, instead of or together with these operating start types also in circuit types in which an inductance is pushed onto the discharge lamp in series.

The reason why the inductance of the coil was fixed so as not to exceed 210 μH is described below.

In the tests, the feed device shown in FIG. 1 and the projector device shown in FIG. 6 were used, the value of the coil L1 was changed and the state of decrease of the light intensity was checked. The discharge lamp was operating with a rated wattage of 120 W and with an operating frequency of 150 Hz.

Specifically, after starting the operation of the lamp in the state in which a transition into rated operation took place, by changing the coil L1 shown in FIG. 1, the flicker of the image was assessed by viewing the image projected onto the screen essentially for about one minute for each coil L1. The timing of the polarity switching of the discharge lamp was not synchronized with the space modulation element and the rotary filter. Furthermore, the dip (corresponds to FIG. 2(b)) of the wattage waveform as a result of polarity switching was measured at each inductance value. The width of this dip of the wattage waveform was measured using the full width at half maximum.

FIG. 11 shows the experimental results. Here, the width of the dip of the wattage waveform, the state of image flicker and the assessment for each inductance (for example, 0 μH, 10.1 μH, 20.5 μH . . . ) are shown. As a result of this test, it was confirmed that, in the case of an inductance of at most 76.1 μH, hardly any image flicker occurred and that, in the case of an inductance from 85.6 μH to 206.0 μH, there was a slight amount of image flicker, but was not a problem in practice. On the other hand, it is shown that in the case of an inductance value of 216.1 μH, the image flicker is regarded as disadvantageous in practice.

Therefore, if the inductance is no more than 210 μH (with consideration of measurement error and the like, although the test value is 206.0 μH), the dip of the light intensity as a result of polarity switching and the image flicker which occurs accordingly have a nonproblematical level. As a result, it becomes apparent that synchronization with the space modulation element and the rotary filter is not required. Furthermore, it becomes apparent that, in the respect of a good picture, more advantageous projection can be carried out when the inductance value is no more than 80.0 μH (with consideration of the measurement error and the like, although the experimental value is 76.1 μH).

What is claimed is:

1. Device for operating a high pressure discharge lamp which comprises:
a high pressure discharge lamp having a silica glass discharge vessel, a pair of opposed electrodes located in the discharge vessel and a trigger electrode located outside of the discharge vessel; and
a feed device which supplies an alternating discharge current with a rectangular waveform to the high pressure discharge lamp,
wherein the feed device comprises:
a starter circuit which produces a high voltage with respect to the trigger electrode when operation is started;

an inverter circuit which has at least two switching devices;
a coil which is located downstream of the inverter circuit and which is series-connected to the discharge lamp; and
a control element which subjects the switching devices to on and off driving in alternation, with a dead time, and
wherein the inductance of the coil is at most 210 μH; and
wherein the feed device subjects the discharge lamp to operating control with a rated operating frequency in the range of from 60 Hz to 1000 Hz.

2. Device for operation of the high pressure discharge lamp as claimed in claim 1, wherein the feed device is adapted to operate the discharge lamp intermittently only short time intervals with a frequency which is lower than the rated operating frequency and is in a range of from 5 Hz to 100 Hz.

3. Device for operating a high pressure discharge lamp which comprises the following:
a high pressure discharge lamp having a silica glass discharge vessel in which a pair of opposed electrodes are located; and
a feed device which supplies an alternating discharge current with a rectangular waveform to the high pressure discharge lamp,
wherein the feed device comprises:
a starter circuit which applies a direct current high voltage to the electrodes when operation is started;
an inverter circuit which has at least two switching devices;
a coil which is located downstream of the inverter circuit and is series-connected to the discharge lamp; and
a control element which subjects the switching devices to on/off driving in alternation with a dead time, and
wherein the starter circuit comprises:
a capacitor which applies a direct current high voltage to the discharge lamp;
a charging circuit for the capacitor;
a diode for preventing a reverse current with respect to the high voltage direct discharge current of the capacitor and which is series-connected to the discharge lamp; and
a circuit which short circuits the diode to prevent a reverse current during rated operation, and
wherein the inductance of the coil is less at most 210 μH; and
wherein the feed device subjects the discharge lamp to operating control with a rated operating frequency in the range of from 60 Hz to 1000 Hz.

4. Device for operation of the high pressure discharge lamp as claimed in claim 3, wherein the feed device is adapted to operate the discharge lamp intermittently only short time intervals with a frequency which is lower than the rated operating frequency and is in a range of from 5 Hz to 100 Hz.

5. Projector device which comprises:
a rotary filter having color regions of at least R(ed)G(reen)B(lue);
a rotary drive means for the rotary filter;
a space modulation element which receives light which has passed through the rotary filter; and
an operation device for operating a high pressure discharge lamp,
wherein the operation device has a high pressure discharge lamp with a silica glass discharge vessel in which a pair of opposed electrodes are located and on which a trigger electrode is located, and a feed device which supplies an alternating discharge current with a rectangular waveform to the high pressure discharge lamp, said feed device comprising:
a starter circuit which produces a high voltage with respect to the trigger electrode when operation is started;
an inverter circuit which has at least two switching devices;
a coil which is located downstream of this inverter circuit, which is series-connected to the discharge lamp and which has an inductance of at most 210 μH; and
a control element which subjects the switching devices to on/off driving in alternation with a dead time, and
wherein the control element subjects the switching devices to on/off driving asynchronously to the rotary filter and the space modulation element; and
wherein the feed device subjects the discharge lamp to operating control with a rated operating frequency in the range of from 60 Hz to 1000 Hz.

6. Projector device which comprises:
a rotary filter having color regions of at least R(ed)G(reen)B(lue);
a rotary drive means for the rotary filter;
a space modulation element which receives light which has passed through the rotary filter; and
an operation device for operating a high pressure discharge lamp,
wherein the operation device has a high pressure discharge lamp with a silica glass discharge vessel in which a pair of opposed electrodes are located, and a feed device which supplies an alternating discharge current with a rectangular waveform to the high pressure discharge lamp, the feed device comprising:
a starter circuit which applies a direct current high voltage to the electrodes when operation is started;
an inverter circuit which has at least two switching devices;
a coil which is located downstream of this inverter circuit, which is series-connected to the discharge lamp, and which has an inductance of at most 210 μH; and
a control element which subjects the switching devices to on/off driving in alternation with a dead time, and
wherein the starter circuit comprises:
a capacitor which applies a high voltage direct discharge current to the discharge lamp;
a charging circuit for the capacitor;
a diode for preventing a reverse current with respect to the direct current of said capacitor and which is series-connected to the discharge lamp; and
a circuit which short circuits said diode to prevent a reverse current during rated operation, and
wherein the control element subjects the switching devices to on/off driving asynchronously to the rotary filter and to the space modulation element; and
wherein the feed device subjects the discharge lamp to operating control with a rated operating frequency in the range of from 60 Hz to 1000 Hz.

* * * * *

UNITED STATES PATENT AND TRADEMARK OFFICE
CERTIFICATE OF CORRECTION

PATENT NO. : 7,138,769 B2 Page 1 of 1
APPLICATION NO. : 11/012176
DATED : November 21, 2006
INVENTOR(S) : Yoshikazu Suzuki et al.

It is certified that error appears in the above-identified patent and that said Letters Patent is hereby corrected as shown below:

Title page, item (75) Inventors: should read as follow:
Yoshikazu Suzuki, Yokohama (JP)
Katumi Sugaya, Takasago (JP)
Tomoyoshi Arimoto, Tatuno (JP)

Signed and Sealed this

First Day of May, 2007

JON W. DUDAS
*Director of the United States Patent and Trademark Office*